United States Patent [19]

Kupersmit

[11] 4,221,302
[45] Sep. 9, 1980

[54] DOOR CONSTRUCTION FOR FOLDING CONTAINER

[75] Inventor: Julius B. Kupersmit, New York, N.Y.

[73] Assignee: Container Systems Corp., Springfield Gardens, N.Y.

[21] Appl. No.: 824,160

[22] Filed: Aug. 12, 1977

[51] Int. Cl.³ .................. B65D 6/00; B65D 88/00
[52] U.S. Cl. .................. 220/4 F; 220/4 R; 220/1.5; 220/345
[58] Field of Search .......... 220/4 R, 4 F, 1.5, 345

[56] References Cited
U.S. PATENT DOCUMENTS

| | | | |
|---|---|---|---|
| 3,337,983 | 8/1967 | Ebstein | 220/4 R X |
| 3,374,915 | 3/1968 | Verhein et al. | 220/4 F |
| 3,655,087 | 4/1972 | Luisada | 220/4 F X |
| 3,940,007 | 2/1976 | Griffiths | 220/4 F |

Primary Examiner—Steven M. Pollard
Attorney, Agent, or Firm—Charles E. Temko

[57] ABSTRACT

An improved door construction for collapsible reusable shipping containers and the like incorporating provision for maintaining the strength and integrity of the container against the hydraulic action of flowable contents when loaded. The container includes a plurality of interlocking flange elements capable of relative sliding movement in a vertical direction, but resisting movement in a horizontal plane.

1 Claim, 4 Drawing Figures

U.S. Patent  Sep. 9, 1980  4,221,302
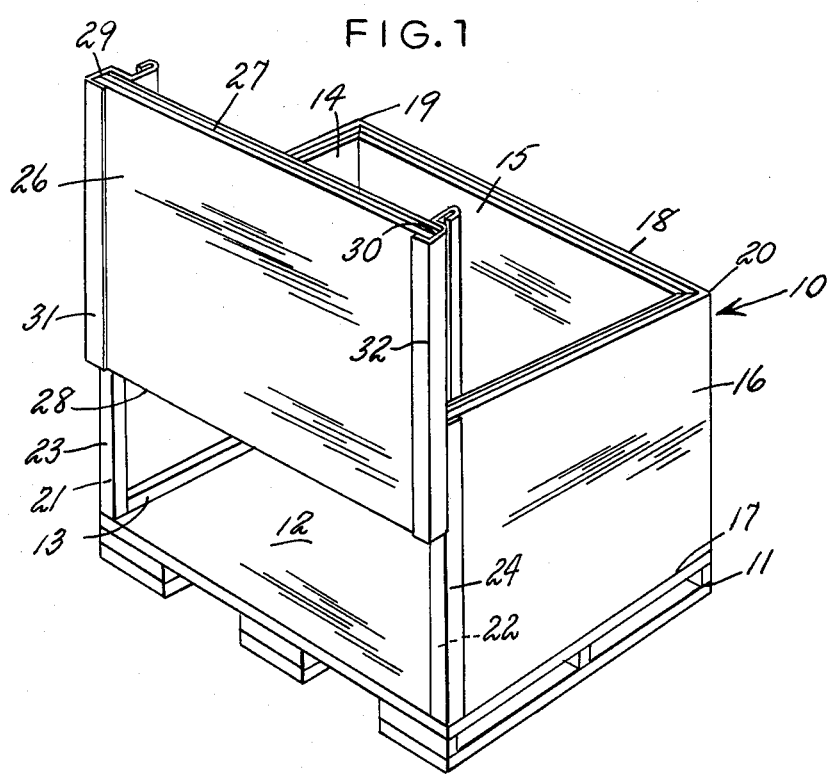
FIG. 1
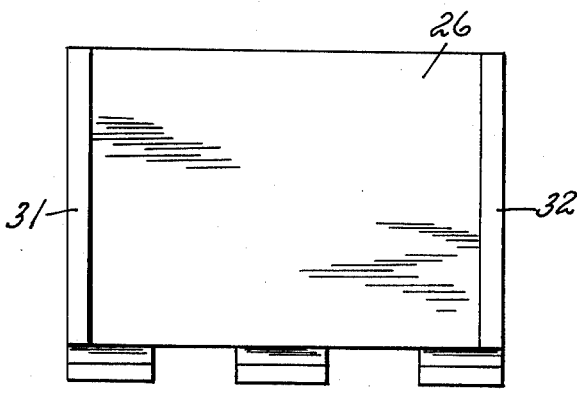
FIG. 2
FIG. 3
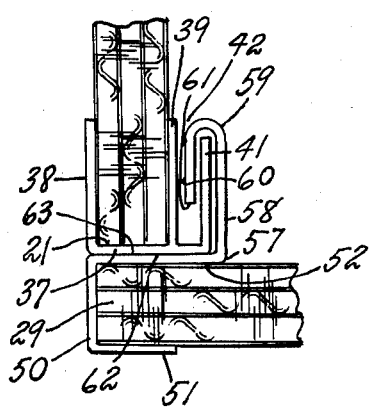
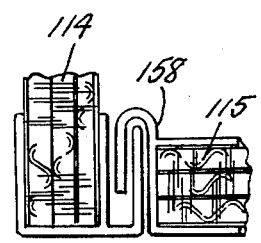
FIG. 4

DOOR CONSTRUCTION FOR FOLDING CONTAINER

BACKGROUND OF THE INVENTION

This invention relates generally to the field of collapsible reusable shipping containers of the type disclosed in my prior U.S. Pat. No. 3,443,737 granted Apr. 13, 1969; and more particularly to an improved sliding door construction which may be incorporated into a vertical wall of such container to impart greater structural rigidity thereto under fluid loads which tend to exert a hydraulic outward pressure against the inner surfaces of the container.

In the container disclosed in the above patent, the door is supported in a through opening in a side wall by a pair of extrusions of generally H-shaped cross section, each of which define opposed recesses engaging a vertically disposed edge of the door opening, and a corresponding vertical edge on the door. While this arrangement does guide the door smoothly during opening and closing movement, the pressure on the edges of the abutting wall is entirely frictional in nature, and when the container is loaded, for example, with a relatively heavy particulate load, resistance to outward deformation of the wall and the door depends almost entirely upon the engagement of the wall at the lower edges thereof with the rigid pallet, and the engagement of the upper edges thereof beneath the rim of the detachable lid. Depending upon the height and thickness of the walls of the container, and the density of the fluid load, this construction has at times proven inadequate. It is, of course, possible to rigidly interconnect the extrusions to the edges of the wall, but since the door edges must remain free to move in order to selectively open the door, this expedient has but limited utility.

SUMMARY OF THE INVENTION

Briefly stated, the invention contemplates the provision of an improved door construction in which the door comprises an entire side wall of the container, and is provided with vertical edge flanges slidably engaged with corresponding flanges on the free vertical edges of adjacent side walls for vertical relative movement while resisting relative movement in a horizontal plane. The flange elements are each fixedly interconnected to an engaged edge of a respective wall or door, and not only resist outwardly directed forces tending to bow the walls of the container, but provide an additional function in increasing the rigidity of at least two of the four vertical edges of the container.

BRIEF DESCRIPTION OF THE DRAWING

In the drawing, to which reference will be made in the specification, similar reference characters have been employed to designate corresponding parts throughout the several views.

FIG. 1 is a fragmentary perspective view of an embodiment of the invention.

FIG. 2 is a side elevational view thereof showing a door member in altered relative position.

FIG. 3 is an enlarged fragmentary horizontal sectional view as seen from the plane 3—3 in FIG. 2.

FIG. 4 is a sectional view corresponding to that seen in FIG. 3, but showing an alternate form of the embodiment.

DETAILED DESCRIPTION OF THE DISCLOSED EMBODIMENT

In accordance with the invention, the device, generally indicated by reference character 10 includes a pallet element 11 of known type, as for example, that disclosed in my above identified prior patent. An upper surface 12 thereof mounts a peripheral mounting member 13 engaging first, second and third fixed side walls 14, 15 and 16, respectively, along a continuous lower edge 17 thereof. The walls 13–15 include a continuous upper edge 18, and are interconnected at first and second edge folds 19 and 20, respectively. The walls 14 and 15 terminate in free edges 21 and 22.

Mounted on the edges 21 and 22 are first and second flange elements 23 and 24 which are formed as metallic or synthetic resinous extrusions. In contast to my prior construction, they are positively interconnected to the side walls 14 and 15, using epoxy or other suitable high strength adhesives.

Overlying the edges 21 and 22 is a cooperating door element 26 bounded by an upper edge 27, a lower edge 28 and side edges 29 and 30. Mounted on edges 29 and 30 are third and fourth flange elements 31 and 32 which co-act with flange elements 23 and 24.

As best seen in FIG. 3 in the drawing, the flange elements 22 and 23 are of generally E-shaped configuration, including a base wall 37, and a first outer flange 38 and a second inner flange 39 defining a first interstice in which a free edge 20 or 21 is fixedly engaged, using the above mentioned adhesive (not shown). A third flange 41 lying in a plane parallel to that of the first and second flanges defines a second interstice or groove 42, the axial opening of which faces inwardly with respect to the container.

Referring to the third and fourth flange elements 31 and 32, respectively, each includes a base wall 50, from which extend first and second flanges 51 and 52, respectively, defining a third interstice for the reception in fixed relation of a free side edge 29–30, again, fixedly interconnected by gluing (not shown).

The second flange 52 communicates at an inner edge 57 thereof with a third flange 58 disposed at right angles with respect to the plane of the flange 57. The third flange is, in turn, interconnected with a 180° bent portion 59 which, in turn, supports a fourth flange 60 terminating in a free edge 61.

When the door element 26 is in position wherein the first and second flange elements are engaged with the third and fourth flange elements, an outer surface 62 of each flange 52 overlies a corresponding surface 63 on the base wall 37 of a first and second flange element, whereby inward movement of the door element relative to the container is prevented. The engagement of the fourth flange 60 within the groove or channel 42 prevents outward movement of the door element, and thus relative movement between the door element and the fixed side walls 14–16 is limited to vertical reciprocation.

Turning now to the alternate form of the embodiment illustrated in FIG. 4, parts corresponding to those of the principal embodiment have been designated by similar reference characters with the additional prefix "1".

The alternate form of the embodiment is employed where it is desired that the door element be situated between the inner surfaces of the opposed side walls 114 and 115, rather than overlie the free edges thereof. This is accommodated by forming the channel which engages the free edges of the door element on an inwardly disposed surface of the third flange 158, which permits the elimination of the base wall 50 and first flange 51 in the principal embodiment.

I wish it to be understood that I do not consider the invention limited to the precise details of structure shown and set forth in this specification, for obvious modifications will occur to those skilled in the art to which the invention pertains.

I claim:

1. In a collapsable shipping container construction having a relatively rigid pallet, a plurality of interconnected side walls secured to said pallet, there being an opening for loading and unloading in the plane of one of said side walls, and a slidably mounted door selectively closing said opening, the improvement comprising: said container including first and second oppositely disposed side walls, and a third wall permanently interconnecting each of said first and second side walls, and disposed at a mutual right angle relative to each said wall; said first and second side walls having first and second free edges, respectively, bordering said loading opening; first and second elongated flange elements defining first channels therein fixedly secured to said first and second edges, respectively; each of said first and second flange elements being of generally E-shaped cross-section and defining a pair of parallel axially disposed channels therein, one of said channels engaging one of said first and second free edges, the other of said channels having an axially extending opening facing the interior of said container; said door extending substantially over the entire area of one side of said container, and having third and fourth free side edges overlying said first and second edges; third and fourth flange elements fixedly secured to said third and fourth edges, respectively, of said door, said third and fourth flange elements each defining an elongated U-shaped flange slidably engaged within one of the other of said channels in said first and second flange elements, whereby outward movement of said door relative to said container is prevented; said first and second flange elements each having a planar outwardly disposed surface slidably engaging a corresponding inwardly disposed surface on one of said third and fourth flange elements for preventing inward movement of said door relative to said container, and providing a substantial bearing surface for guiding sliding movement.

* * * * *